US010987700B2

(12) United States Patent
Li

(10) Patent No.: US 10,987,700 B2
(45) Date of Patent: Apr. 27, 2021

(54) ARTICLE SORTING SYSTEM HAVING SECURITY INSPECTION FUNCTION

(71) Applicant: BEIJING GEEKPLUS TECHNOLOGY CO., LTD., Beijing (CN)

(72) Inventor: Hongbo Li, Beijing (CN)

(73) Assignee: Beijing Geekplus Technology Co., Ltd., Beijing (CN)

(*) Notice: Subject to any disclaimer, the term of this patent is extended or adjusted under 35 U.S.C. 154(b) by 174 days.

(21) Appl. No.: 16/475,543

(22) PCT Filed: Jul. 12, 2018

(86) PCT No.: PCT/CN2018/095443
§ 371 (c)(1),
(2) Date: Jul. 2, 2019

(87) PCT Pub. No.: WO2019/109641
PCT Pub. Date: Jun. 13, 2019

(65) Prior Publication Data
US 2019/0337020 A1    Nov. 7, 2019

(30) Foreign Application Priority Data

Dec. 6, 2017  (CN) .......................... 201711283191.7

(51) Int. Cl.
B07C 3/18        (2006.01)
B66F 9/06       (2006.01)
(Continued)

(52) U.S. Cl.
CPC .................. B07C 3/18 (2013.01); B07C 3/02 (2013.01); B65G 1/0492 (2013.01); B66F 9/063 (2013.01);
(Continued)

(58) Field of Classification Search
CPC ....................................................... B66F 9/063
See application file for complete search history.

(56) References Cited

U.S. PATENT DOCUMENTS

2003/0031293 A1* 2/2003 Aust .................... G01V 5/0016
378/57
2014/0376692 A1  12/2014 Schafer et al.
(Continued)

FOREIGN PATENT DOCUMENTS

CN     105116463 A    12/2015
CN     205691794 U    11/2016
(Continued)

OTHER PUBLICATIONS

International Search Report for PCT/CN2018/095443 dated Sep. 18, 2018 with English Translation.

*Primary Examiner* — Thomas Randazzo
(74) *Attorney, Agent, or Firm* — Arent Fox LLP

(57) ABSTRACT

Provided is an article sorting system having a security inspection function which relates to intelligent logistics. The system includes: a security inspection machine including a detector, a security inspection driving device and a security inspection channel; and a mobile transport device matched with the security inspection channel in space, which is configured to move a received article to be sorted by using the security inspection driving device so that the article to be sorted passes through the security inspection channel and accepts a security detection performed by the detector in the security inspection channel. Alternatively, the system includes: a security inspection machine including a detector and a security inspection channel; and a mobile transport device matched with the security inspection channel in space, which is configured to move the received article to be sorted so that the article to be sorted passes through the (Continued)

security inspection channel and accepts the security detection performed by the detector in the security inspection channel.

20 Claims, 2 Drawing Sheets

(51) Int. Cl.
*B07C 5/00* (2006.01)
*B07C 3/02* (2006.01)
*B65G 1/04* (2006.01)
*G01N 23/02* (2006.01)
*G01V 5/00* (2006.01)
*G05B 19/418* (2006.01)

(52) U.S. Cl.
CPC ........... *G01N 23/02* (2013.01); *G01V 5/0016* (2013.01); *G05B 19/41895* (2013.01); *B07C 2501/0063* (2013.01)

(56) References Cited

U.S. PATENT DOCUMENTS

| | | | | |
|---|---|---|---|---|
| 2016/0223474 | A1* | 8/2016 | Tang | B07C 5/3416 |
| 2018/0180761 | A1* | 6/2018 | Zhang | G01N 21/65 |
| 2019/0348898 | A1* | 11/2019 | Frangen | H02K 11/21 |

FOREIGN PATENT DOCUMENTS

| | | |
|---|---|---|
| CN | 206492715 U | 9/2017 |
| CN | 107352205 A | 11/2017 |
| CN | 107855284 A | 3/2018 |
| JP | H04105853 A | 4/1992 |
| JP | H09118428 A | 5/1997 |
| JP | 2001233440 A | 8/2001 |
| JP | 2002053205 A | 2/2002 |
| JP | 2003197711 A | 7/2003 |
| JP | 2013127734 A | 6/2013 |
| JP | 2015531730 A | 11/2015 |
| JP | 2018162132 A | 10/2018 |
| WO | 2014029742 A1 | 2/2014 |
| WO | 2016137603 A1 | 9/2016 |

\* cited by examiner

ARTICLE SORTING SYSTEM HAVING SECURITY INSPECTION FUNCTION

CROSS-REFERENCE TO RELATED APPLICATIONS

This application is a US national phase application of international patent application No. PCT/CN2018/095443 filed on Jul. 12, 2018, which claims priority to Chinese patent application No. 201711283191.7, entitled "ARTICLE SORTING SYSTEM HAVING SECURITY INSPECTION FUNCTION" and filed on Dec. 6, 2017, the disclosure of which is incorporated herein by reference in its entirety.

TECHNICAL FIELD

The present disclosure relates to intelligent logistics and, in particular, to an article sorting system having a security inspection function.

BACKGROUND

With a rapid development of e-commerce, online shopping is becoming more and more popular. However, there are many hidden risks in increasingly frequent cross-regional express delivery logistics. The number of crimes committed by those who use the management defects of express delivery logistics industry is also increasing year by year. Therefore, how to strengthen the security management of the express delivery logistics industry in cities has become the focus of social management.

SUMMARY

The following is a summary of the subject matter described herein in detail. This summary is not intended to limit the scope of the claims.

Embodiments of the present disclosure provide an article sorting system having a security inspection function.

The embodiments of the present disclosure provide an article sorting system having a security inspection function. The system includes: a security inspection machine, which is provided with a detector, a security inspection driving device and a security inspection channel, and a mobile transport device matched with the security inspection channel in space, which is configured to move a received article to be sorted by using the security inspection driving device so that the article to be sorted passes through the security inspection channel, and accepts a security detection performed by the detector in the security inspection channel. Alternatively, the system includes: a security inspection machine, which is provided with a detector and a security inspection channel, and a mobile transport device matched with the security inspection channel in space, which is configured to move a received article to be sorted so that the article to be sorted passes through the security inspection channel, and accepts the security detection performed by the detector in the security inspection channel.

According to a specific implementation of the present disclosure, the security inspection machine is in communication with the mobile transport device, and the mobile transport device, before entering the security inspection machine, sends an identifier of the mobile transport device to the security inspection machine.

According to a specific implementation of the present disclosure, the article to be sorted on the mobile transport device is provided with an address information code related to a destination of the article to be sorted.

According to a specific implementation of the present disclosure, the system further includes: an article feeding end where the article to be sorted is placed on the mobile transport device in a manual or automatic manner.

According to a specific implementation of the present disclosure, the mobile transport device includes a carrying platform. The carrying platform is configured to receive one or more articles to be sorted.

According to a specific implementation of the present disclosure, the carrying platform is any one of a flap, a belt, a cross belt and a roller.

According to a specific implementation of the present disclosure, the system further includes an article information identifying device. The article information identifying device is provided with an article inspecting device and the article inspecting device may acquire article information of the article to be sorted when the article to be sorted is entering the article information identifying device.

According to a specific implementation of the present disclosure, the mobile transport device acquires the article information through the article inspecting device at a position of the article information identifying device.

According to a specific implementation of the present disclosure, the article information includes a destination of the article to be sorted.

According to a specific implementation of the present disclosure, the article information identifying device is disposed at the article feeding end.

According to a specific implementation of the present disclosure, the system further includes a transport travelling platform for providing a mobile supporting platform for the mobile transport device.

According to a specific implementation of the present disclosure, the transport travelling platform is any one of a ground platform, a track platform and a built platform.

According to a specific implementation of the present disclosure, the system further includes an article falling end, which is provided with an article receiving device. The article receiving device receives the article to be sorted being delivered by the mobile transport device.

According to a specific implementation of the present disclosure, a preset height difference exists between an article delivering point of the mobile transport device and the article falling end.

According to a specific implementation of the present disclosure, the mobile transport device and the article falling end are disposed in the same plane.

According to a specific implementation of the present disclosure, the mobile transport device and the article falling end are disposed in different planes.

According to a specific implementation of the present disclosure, the destination and the article falling end is in a correspondence of any one of one-to-one, many-to-one, one-to-many and many-to-many.

According to a specific implementation of the present disclosure, the system further includes a controller, which is in communication with an article detecting device and the mobile transport device.

According to a specific implementation of the present disclosure, the controller acquires article information of the article to be sorted, and allocates a task or scheduling information to the mobile transport device based on the article information.

According to a specific implementation of the present disclosure, before reaching the security inspection machine, the mobile transport device moves at a first speed.

According to a specific implementation of the present disclosure, after reaching the security inspection machine, the mobile transport device moves at a second speed on the security inspection driving device.

According to a specific implementation of the present disclosure, the mobile transport device receives a speed instruction sent by the security inspection machine, and determines the second speed according to the instruction.

According to a specific implementation of the present disclosure, the security inspection machine is placed in front of or behind the article information identifying device, and the mobile transport device, after receiving the article to be sorted from the article feeding end, enters the security inspection machine.

According to a specific implementation of the present disclosure, the security inspection machine detects whether the article to be sorted on the mobile transport device is safe, and sends a detection result to the mobile transport device.

The mobile transport device continues to perform a sorting task in response to determining that the article to be sorted is a safe article.

The mobile transport device moves to a designated area in response to determining that the article to be sorted is an unsafe article.

According to a specific implementation of the present disclosure, the security inspection machine is placed in front of the article falling end.

According to a specific implementation of the present disclosure, the security inspection machine detects whether the article to be sorted on the mobile transport device is safe, and sends a detection result to the mobile transport device.

In response to determining that the article to be sorted is a safe article, the mobile transport device delivers the article to be sorted to the article falling end.

In response to determining that the article to be sorted is an unsafe article, the mobile transport device moves to a designated area.

According to a specific implementation of the present disclosure, the controller acquires power usage information of the mobile transport device, and in response to determining that remaining power of the mobile transport device meets a preset condition, makes the mobile transport device move to a preset area to get charged.

According to a specific implementation of the present disclosure, the mobile transport device is navigated by identifying a combination of graphics.

According to a specific implementation of the present disclosure, the mobile transport device is navigated through a system or in an autonomous manner.

According to a specific implementation of the present disclosure, one or more sides of a periphery of the carrying platform are provided with an auxiliary device for preventing a parcel from slipping.

The article sorting system having a security inspection function provided by the embodiments of the present disclosure is essentially a parallel sorting system, which can avoid system suspension caused by certain articles (for example, parcels) which fail to meet security inspection requirements. In addition, when a mobile transport device (for example, a robot) carries the parcel passing through a security inspection machine and implements a parcel sorting task, a differential operation mode is adopted (the mobile transport device carries the parcel to pass through the security inspection machine at a low speed, thereby ensuring the security inspection quality; and the mobile transport device delivers the parcel at a high speed, thereby improving parcel sorting efficiency), which can effectively ensure the security inspection quality and greatly improve the parcel sorting efficiency.

Other aspects can be understood after the drawings and detailed description are read and understood.

BRIEF DESCRIPTION OF DRAWINGS

The drawings used in the description of the embodiments of the present disclosure will be described below.

DETAILED DESCRIPTION

Embodiments of the present disclosure will be described below in detail in conjunction with the drawings.

The embodiments described above are part, not all, of embodiments of the present disclosure. Based on the embodiments described herein, all other embodiments obtained by those skilled in the art without creative work are within the scope of the present disclosure.

Figure 1:
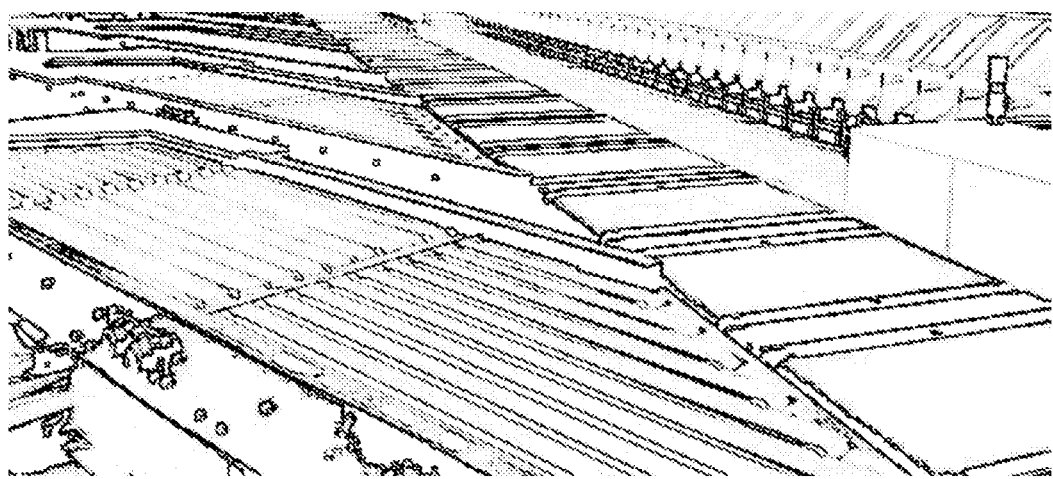
FIG. 1 is a schematic diagram of an article sorting system in the existing art.

FIG. 1 is a schematic diagram of an article sorting system in the existing art. As shown in FIG. 1, a parcel sorting system such as a cross-belt sorting machine and a security inspection device are combined. The security inspection device is installed at an entrance of the parcel sorting system or at a specific point, thereby implementing simultaneously two functions of parcel sorting and parcel security inspection. However, since the parcel sorting system such as the cross-belt sorting machine is a serial system, for the system combining the parcel sorting system and the security inspection machine, in order to ensure the security inspection quality, the parcel needs to pass through the security inspection channel at a low speed. As a result, the operation speed of the whole parcel sorting system such as the cross-belt sorting machine is greatly reduced, and the parcel sorting efficiency is also greatly reduced. If a certain parcel fails to meet security requirements and needs to be checked by related personnel, the whole system will suspend. Therefore, how to efficiently, flexibly and accurately sort parcels with low costs and implement the security inspection function at the same time has always been a focus for the express delivery logistics industry.

The present disclosure provides a robotic system and method for parcel sorting and security inspection. The robotic system for parcel sorting is essentially a parallel sorting system, which can avoid system suspension caused by certain parcels which fail to meet security inspection requirements. In addition, when a parcel sorting robot carries the parcel to pass through a security inspection machine and implements the parcel sorting task, a differential operation mode is adopted (that is, the parcel sorting robot carries the parcel to pass through the security inspection machine at a low speed, thereby ensuring the security inspection quality; and the parcel sorting robot delivers the parcel at a high speed, thereby improving parcel sorting efficiency), which can effectively ensure the security inspection quality and greatly improve the parcel sorting efficiency. The new robotic system and method for parcel sorting and security inspection provided by the present disclosure can effectively implement the functions of parcel security inspection and efficient sorting, and have the advantages of a flexible parcel sorting robot system.

Figure 2:
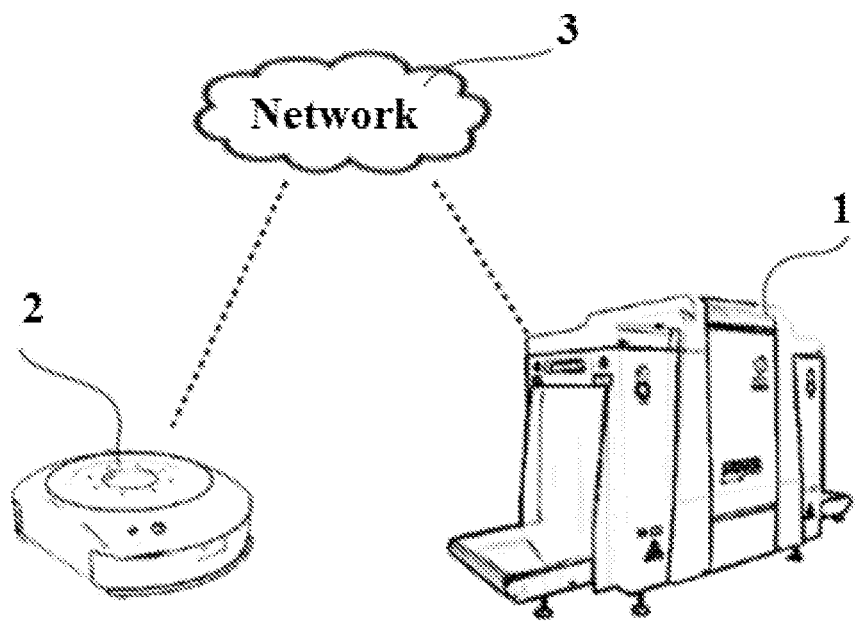
FIG. 2 is a schematic diagram of an article sorting system having a security inspection function according to an embodiment of the present disclosure.

Referring to FIG. 2, the embodiments of the present disclosure provide an article sorting system having a security inspection function. The system includes: a security inspection machine 1, which is provided with a detector, a security inspection driving device and a security inspection channel; and a mobile transport device 2 matched with the security inspection channel in space. The mobile transport device 2 moves a received article to be sorted by using the security inspection driving device so that the article to be sorted passes through the security inspection channel and accepts a security detection performed by the detector in the security inspection channel.

The security inspection machine 1 may include a detector. The detector is configured to detect the article to be sorted such as a baggage parcel passing through the security inspection machine, and determine whether the article carried on the mobile transport device 2 is safe.

The mobile transport device 2 may be a wheeled robot of any type and in any shape. The mobile transport device 2 is configured to carry one or more articles to be sorted (such as parcels). A destination address information code is included in destination information related to the article.

The destination address information code is disposed on the article to be sorted. Different from a conventional mobile transport device passing through the security inspection machine, the mobile transport device 2 in the embodiment is modified to be matched with the security inspection channel, so that the mobile transport device 2 can pass through the security inspection machine 1 even if the mobile transport device 2 carries articles.

The system may include multiple security inspection machines 1 and multiple transport devices 2. In order to ensure the effective cooperation of the security inspection machine 1 and the mobile transport device 2, according to a specific implementation of the present disclosure, the security inspection machine 1 is in communication with the mobile transport device 2, and the mobile transport device 2, before entering the security inspection machine, sends an identifier of the mobile transport device 2 to the security inspection machine 1. In such way, the security inspection machine may call or identify, through a network 3, the mobile transport device 2 which passes through or is going to pass through the security inspection machine.

The mobile transport device 2 may transport one or more articles to be sorted. In order to effectively transport the article to a destination, according to a specific implementation of the present disclosure, the article to be sorted on the mobile transport device 2 is provided with an address information code related to the destination of the article to be sorted. For example, information represented by the address information code may be "Wang Xiaoming, xx Residential District, xx Street, Chaoyang District, Beijing".

In order to facilitate the mobile transport device to acquire the article to be sorted, according to a specific implementation of the present disclosure, the system may further include an article feeding end. The article feeding end provides one or more articles to be sorted and forms a first area. The article feeding end carries articles which need to be sorted (that is, the article to be sorted). The article herein may be parcels which need to be transported, or may be other articles or goods which need to be sorted and delivered. At the article feeding end, the article to be sorted which needs to be transported is placed on the mobile transport device 2 in a manual or automatic manner.

The mobile transport device 2 may include a carrying platform. The carrying platform is configured to receive one or more articles to be sorted. According to a specific implementation of the present disclosure, the carrying platform is any one of a flap, a belt, a cross belt and a roller. Of course, the carrying platform may be set to be other common or required types of platforms as necessary. In addition, the carrying platform may be further provided with a lifting device. Through the lifting device, the mobile transport device 2 can lift an object to be transported (for example, a shelf containing the article to be sorted) and place it on the carrying platform of the mobile transport device 2. After the object to be transported is lifted, the object can leave a plane (for example, the ground) where it was placed and be moved with the mobile transport device 2. The mobile transport device 2 may pass through the security inspection machine with the object lifted to accept the security inspection.

When acquiring the article to be sorted from the article feeding end, the mobile transport device 2 needs to be told the transportation destination of the article to be sorted. According to a specific implementation of the present disclosure, an article information identifying device is further provided with an article inspecting device. The article inspecting device is configured to acquire article information of the article to be sorted when the article to be sorted is entering the article information identifying device corresponding to the article inspecting device. The article information includes the destination of the article to be sorted. In an application scenario, the article information identifying device is disposed at the article feeding end.

The whole system may be applied in different application scenarios as necessary. In order to facilitate the mobile transport device 2 to transport the article, according to a specific implementation of the present disclosure, the system further includes a transport travelling platform. The transport travelling platform provides a mobile supporting platform for the mobile transport device 2. The transport travelling platform may be any one of a ground platform, a track platform and a built platform. Of course, the transport travelling platform may also be other types of platforms or devices.

In order to facilitate the mobile transport device 2 to transport the article to be sorted, the system may further include an article falling end. The article falling end receives the article to be sorted transported by the mobile transport device 2. The bottom of the article falling end and the bottom of the mobile transport device 2 may be in the same plane, or may be in different planes.

According to a specific implementation of the present disclosure, the article falling end may be a cage, or may be other types of containers which can receive the article to be sorted. For example, in a high platform scheme, the article falling end is generally placed below an article falling opening of the platform. The article falling end receives goods falling from the article falling opening of the platform so as to complete the reception of the goods to be sorted. Alternatively, the bottom of the article falling end is in the same plane as the bottom of the mobile transport device 2, so that no high platform is required, saving construction costs. At the same time, when the position of the article falling end needs to be adjusted, the article falling end may be disposed at any position. This flexible placement may meet requirements of different types of installation sites.

In order to enable the mobile transport device 2 to find the corresponded article falling end, a position identifier may be set for each article falling end. In such way, the mobile transport device 2 may find the corresponded article falling end according to position information of the destination corresponding to the task it performed. In an embodiment, a matrix 2-dimensional (2D) bar code may be set in the plane of an article sorting platform having a security inspection function. Different 2D bar codes represent different geographical positions. The mobile transport device 2 reaches a preset position by identifying the 2D bar code. In another example, a position tag which can automatically transmit a signal (for example, a wireless signal) is installed within the article falling end. The mobile transport device 2 automatically plans a path to the article falling end through the wireless signal.

When completing the transportation of the goods at the article falling end, the mobile transport device 2 will automatically record a latest position of the article falling end, and report the latest position to a task server, or transmit the latest position to other mobile transport devices 2 in a broadcast mode.

According to a specific implementation of the present disclosure, a preset height difference is exists between an article delivering point of the mobile transport device 2 and the article falling end. In such way, the parcel and other articles are delivered to a target article falling end by using the gravity and the height difference described above, thereby implementing the parcel sorting task. The height difference described above may be implemented in different modes. For example, it may be implemented by building a high platform (for example, a steel frame platform). When the mobile transport device 2 runs above the platform, the article falling end for receiving the parcel is disposed below the platform.

In order to facilitate scheduling and optimization of transportation resources, a correspondence between the destination of the article to be sorted and the article falling end may be any one of one-to-one, many-to-one, one-to-many and many-to-many.

In a case that there are multiple security inspection machines and multiple mobile transport devices in the system, in order to optimize transportation resources and improve the article sorting efficiency, according to an implementation form of the embodiments of the present application, the system further includes a controller. The controller is in communication with the article detection device and the mobile transport device 2. The controller may be a server having functions of scheduling and control, or may be other devices having the control function. The controller acquires running states of all devices in the system, and uniformly schedules the resources. According to a specific implementation of the present disclosure, the controller is configured to acquire article information of the article to be sorted, and allocate a task or scheduling information to the mobile transport device 2 based on the article information.

A differential operation mode is adopted when the mobile transport device 2 passes through the security inspection machine with the article being carried and when the mobile transport device 2 implements the article sorting task. That is, the mobile transport device 2 passes through the security inspection machine at a low speed when the article is carried, thereby ensuring the security inspection quality; and the mobile transport device 2 delivers the article at a high speed, thereby improving parcel sorting efficiency. According to a specific implementation of the present disclosure, the mobile transport device 2 moves at a first speed before reaching the security inspection machine 1, and the mobile transport device 2 moves at a second speed on the security inspection driving device after reaching the security inspection machine 1.

The second speed may be determined by the controller according to current resources and sent to the mobile transport device 2, or may be determined by the security inspection machine 1 according to an actual speed of the security inspection, or may be specifically determined by the mobile transport device 2 according to a received instruction. According to a specific implementation of the present disclosure, the mobile transport device 2 receives a speed instruction sent by the security inspection machine 1, and determines the second speed according to the instruction.

The security inspection of the article may be implemented in two modes, front-mounted security inspection and rear-mounted security inspection. According to a specific implementation of the present disclosure, the security inspection machine 1 is placed in front of or behind the article information identifying device. The mobile transport device 2, after receiving the article to be sorted from the article feeding end, enters the security inspection machine 1. The security inspection machine 1 is configured to detect whether the article to be sorted on the mobile transport device 2 is safe, and send a detection result to the mobile transport device 2. In response to determining that the article to be sorted is a safe article, the mobile transport device 2 continues to perform the sorting task. In response to determining that the article to be sorted is an unsafe article, the mobile transport device 2 moves to a designated area.

For the front-mounted security inspection, the security inspection machine 1 may directly send the detection result to the mobile transport device 2. At this time, the security inspection machine 1 and the mobile transport device 2 are in a direct communication state. In addition, the security inspection machine 1 may also send the detection result to the controller (for example, the scheduling server). The controller processes the detection result and sends the processed result (for example, a result for demanding the mobile transport device 2 to move to the designated area) to the mobile transport device 2.

As a specific implementation of the rear-mounted security inspection, the security inspection machine 1 is place in front of the article falling end. At this time, the article feeding end places one or more articles to be sorted on a carrying device of the mobile transport device 2 in a manual or automatic manner. At the position of the article information identifying device, the mobile transport device 2 acquires information related to the destination of the article to be sorted through the article inspecting device. A control system presets a correspondence between the destination of the article to be sorted and the article falling end. The mobile transport device 2 moves the article to be sorted to the position of the security inspection machine and passes through the security inspection machine at a speed required by the security inspection machine. If the article to be sorted meets security requirements, the mobile transport device 2 continues to perform the article sorting function; and if the article to be sorted fails to meet the security requirements, the mobile transport device 2 transports the article to be sorted to a designated place according to a security inspection processing principle or delivers the article to be sorted to a designated article falling end. The security inspection machine 1 detects whether the article to be sorted on the mobile transport device 2 is safe, and sends the detection result to the mobile transport device 2. In response to determining that the article to be sorted is a safe article, the mobile transport device 2 delivers the article to be sorted to the article falling end. In response to determining that the article to be sorted is an unsafe article, the mobile transport device 2 moves to the designated area.

For the rear-mounted security inspection, the security inspection machine 1 may directly send the detection result to the mobile transport device 2. At this time, the security inspection machine 1 and the mobile transport device 2 are in a direct communication state. In addition, the security inspection machine 1 may also send the detection result to the controller (for example, the scheduling server). The controller processes the detection result and sends the processed result (for example, the result for demanding the mobile transport device 2 to move to the designated area) to the mobile transport device 2.

The mobile transport device 2 further includes a battery for driving the advancement of the mobile transport device 2. In order to ensure that the mobile transport device 2 has sufficient power for article transportation, according to a specific implementation of the present disclosure, the controller acquires power usage information of the mobile transport device 2, and in response to determining that remaining power of the mobile transport device 2 meets a preset condition, the controller makes the mobile transport device 2 move to a preset area to get charged.

The mobile transport device 2 may be navigated in various manners. According to a specific implementation of the present disclosure, the mobile transport device 2 is navigated by identifying a combination of graphics. The combination of graphics may be a 2D bar code, or may be any graphics combination combined by other graphics. The mobile transport device 2 determines current geographical position information by identifying the graphics combination. In another example, the mobile transport device 2 may be navigated through the global positioning system (GPS) or in other positioning modes.

In addition, the mobile transport device 2 may also adopt a system navigation mode. The article sorting system having a security inspection function detects current position coordinates of the mobile transport device 2 and sends the detected position coordinates of the mobile transport device 2 to the mobile transport device 2 through a common wired or wireless communication network (such as Bluetooth, WiFi, wireless communication, etc.). The mobile transport device 2 is navigated through the movement trend of the mobile transport device 2 and related paths.

In some application scenario, the mobile transport device 2 may also adopt an automatic navigation mode. The mobile transport device 2 has a map reconstruction sensor (for example, a laser sensor). Through the map reconstruction sensor, the mobile transport device 2 may reconstruct a map of the transportation environment, or the coordinate position of the mobile transport device 2 in the map. By transforming destination coordinates received form the server into position coordinates in the reconstructed map, the mobile transport device 2 transports the article to be sorted to the destination.

The security inspection machine 1 generally has a radiation-proof security inspection curtain. In order to prevent the parcel carried on the mobile transport device 2 from slipping when passing through the security inspection curtain, the mobile transport device 2 adds an auxiliary device for preventing a parcel from slipping on one or more sides of a periphery of the carrying platform.

Figure 3:
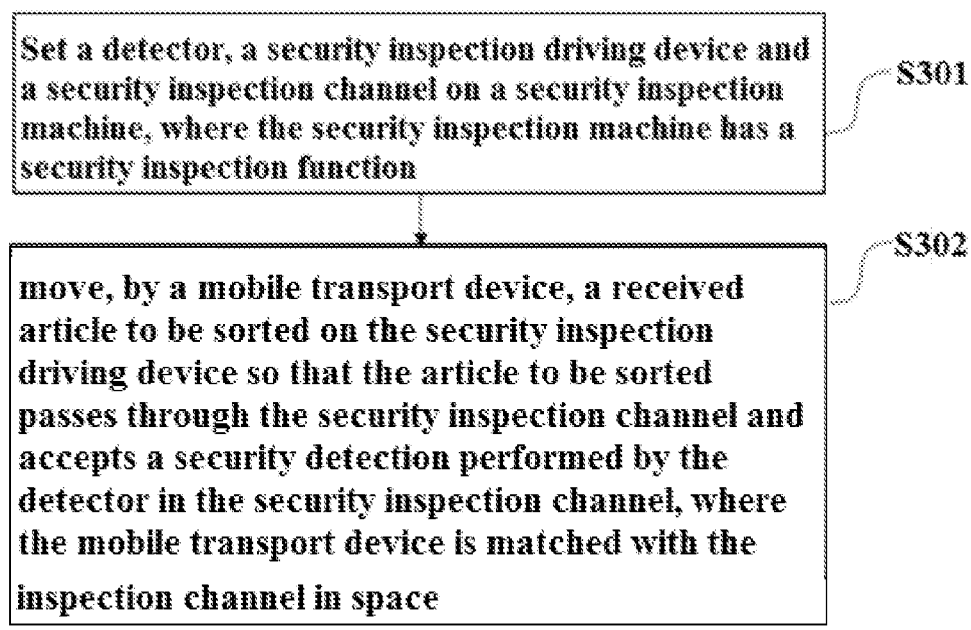
FIG. 3 is a flowchart of an article sorting process having a security inspection function according to an embodiment of the present disclosure.

Corresponding to the system described above, referring to FIG. 3, the embodiments of the present disclosure provide an article sorting method having a security inspection function. The method includes steps S301 and S302.

In step S301, a security inspection machine 1 having a security inspection function is set. The security inspection machine 1 is provided with a detector, a security inspection driving device and a security inspection channel.

In step S302, a mobile transport device 2 matched with the security inspection channel in space is set. The mobile transport device 2 moves a received article to be sorted by using the security inspection driving device so that the article to be sorted passes through the security inspection channel and accepts a security detection performed by the detector in the security inspection channel.

The security inspection machine 1 may include a detector. The detector detects the article to be sorted such as a baggage parcel passing through the security inspection machine, and determines whether the article carried on the mobile transport device 2 is safe.

The mobile transport device 2 may be a wheeled robot of any type and in any shape. The mobile transport device 2 is configured to carry one or more articles to be sorted (for example, parcels). A destination address information code is included in destination information related to the article. The destination address information code is disposed on the article to be sorted. Different from a conventional mobile transport device passing through the security inspection machine, the mobile transport device 2 in the embodiment is modified to match the security inspection channel, so that the mobile transport device 2 can pass through the security inspection machine 1 even if the article is carried by the mobile transport device 2.

According to a specific implementation of the present disclosure, the security inspection machine 1 is in communication with the mobile transport device 2, and the mobile transport device 2, before entering the security inspection machine, sends an identifier of the mobile transport device to the security inspection machine 1.

According to a specific implementation of the present disclosure, the article to be sorted on the mobile transport device is provided with an address information code related to a destination of the article to be sorted.

According to a specific implementation of the present disclosure, the method further includes: providing an article feeding end. The article to be sorted is placed on the mobile transport device 2 in a manual or automatic manner at the article feeding end.

According to a specific implementation of the present disclosure, the mobile transport device 2 includes a carrying platform. The carrying platform is configured to receive one or more articles to be sorted.

According to a specific implementation of the present disclosure, the carrying platform is any one of a flap, a belt, a cross belt and a roller.

According to a specific implementation of the present disclosure, the method further includes: providing an article information identifying device. The article information identifying device is provided with an article inspecting device and the article inspecting device may acquire article information of the article to be sorted when the article to be sorted is entering the article information identifying device.

According to a specific implementation of the present disclosure, the mobile transport device 2 acquires the article information through the article inspecting device at a position of the article information identifying device.

According to a specific implementation of the present disclosure, the article information includes a destination of the article to be sorted.

According to a specific implementation of the present disclosure, the article information identifying device is disposed at the article feeding end.

According to a specific implementation of the present disclosure, the method further includes: providing a transport travelling platform. The transport travelling platform provides a mobile supporting platform for the mobile transport device.

According to a specific implementation of the present disclosure, the transport travelling platform is any one of a ground platform, a track platform and a built platform.

According to a specific implementation of the present disclosure, the method further includes: providing an article falling end. The article falling end is provided with an article receiving device. The article receiving device receives the article to be sorted delivered by the mobile transport device 2.

According to a specific implementation of the present disclosure, a preset height difference exists between an article delivering point of the mobile transport device 2 and the article falling end.

According to a specific implementation of the present disclosure, the mobile transport device 2 and the article falling end are disposed in the same plane.

According to a specific implementation of the present disclosure, the mobile transport device 2 and the article falling end are disposed in different planes.

According to a specific implementation of the present disclosure, a correspondence between the destination and the article falling end is any one of one-to-one, many-to-one, one-to-many and many-to-many.

According to a specific implementation of the present disclosure, the method further includes: providing a controller. The controller is in communication with an article detecting device and the mobile transport device 2.

According to a specific implementation of the present disclosure, the controller acquires article information of the article to be sorted, and allocates a task or scheduling information to the mobile transport device 2 based on the article information.

According to a specific implementation of the present disclosure, before reaching the security inspection machine 1, the mobile transport device 2 moves at a first speed.

According to a specific implementation of the present disclosure, after reaching the security inspection machine 1, the mobile transport device 2 moves at a second speed on the security inspection driving device.

According to a specific implementation of the present disclosure, the mobile transport device 2 receives a speed instruction sent by the security inspection machine 1, and determines the second speed according to the instruction.

According to a specific implementation of the present disclosure, the security inspection machine 1 is placed in front of or behind the article information identifying device, and the mobile transport device 2, after receiving the article to be sorted from the article feeding end, enters the security inspection machine 1.

According to a specific implementation of the present disclosure, the security inspection machine 1 detects whether the article to be sorted on the mobile transport device 2 is safe, and sends a detection result to the mobile transport device 2.

In response to determining that the article to be sorted is a safe article, the mobile transport device continues to perform a sorting task; and in response to determining that the article to be sorted is an unsafe article, the mobile transport device 2 moves to a designated area.

According to a specific implementation of the present disclosure, the security inspection machine 1 is place in front of the article falling end.

According to a specific implementation of the present disclosure, the security inspection machine 1 detects whether the article to be sorted on the mobile transport device 2 is safe, and sends a detection result to the mobile transport device 2.

In response to determining that the article to be sorted is a safe article, the mobile transport device 2 delivers the article to be sorted to the article falling end.

In response to determining that the article to be sorted is an unsafe article, the mobile transport device 2 moves to a designated area.

According to a specific implementation of the present disclosure, the controller acquires power usage information of the mobile transport device 2, and in response to determining that remaining power of the mobile transport device 2 meets a preset condition, makes the mobile transport device 2 move to a preset area to get charged.

According to a specific implementation of the present disclosure, the mobile transport device is navigated by identifying a combination of graphics, through a system or in an autonomous manner.

According to a specific implementation of the present disclosure, one or more sides of a periphery of the carrying platform are provided with an auxiliary device for preventing a parcel from slipping.

The content of the method embodiment described above and the implementation thereof corresponds to the content of the device embodiment and will not be repeated herein.

It is to be understood that the term "one" should be interpreted as "at least one" or "one or more". That is, the number of elements may be one in an embodiment and the number of elements may be more than one in another embodiment. The term "one" should not be interpreted to limit the number.

Although ordinal numbers such as "first" and "second" are used to describe various components, the ordinal numbers are not intended to limit these components herein. Those terms are only used to distinguish one component from another component. For example, a first component may be referred to as a second component, and similarly, the second component may be referred to as the first component, without departing from the concept of the present application. The term "and/or" used herein includes any or all combinations of one or more listed associated items.

Terms used herein are only used to describe embodiments and not intended to limit the present application. As used herein, a singular form is intended to include a plural from, unless clearly indicated in the context. In addition, it will be understood that the terms "including" and/or "having" used in the specification are intended to mean the existence of the described features, numbers, steps, operations, components, elements or combinations thereof, without excluding the existence or addition of one or more other features, numbers, steps, operations, components, elements, or combinations thereof.

The terms used herein, including technical and scientific terms, have the same meanings as the terms commonly understood by those skilled in the art, as long as the terms are not defined differently. It should be understood that the terms defined in the commonly used dictionaries have consistent meanings with the terms in the existing art.

The above are only specific embodiments of the present disclosure and are not intended to limit the present disclosure. It is easy for those skilled in the art to conceive modifications or substitutions within the technical scope of the present disclosure. These modifications or substitutions are within the scope of the present disclosure. Therefore, the protection scope of the present disclosure is subject to the scope of the claims.

What is claimed is:

1. An article sorting system having a security inspection function, comprises:
   a security inspection machine comprising a detector, a security inspection driving device and a security inspection channel, and
   a sorting robot matched with the security inspection channel in space, wherein the sorting robot is configured to move a received article to be sorted on the security inspection driving device so that the article to be sorted passes through the security inspection channel and accepts a security detection performed by the detector in the security inspection channel; or
   the article sorting system comprises:
   a security inspection machine comprising a detector and a security inspection channel, and
   a sorting robot matched with the security inspection channel in space, wherein the sorting robot is configured to move a received article to be sorted so that the article to be sorted passes through the security inspection channel and accepts a security detection performed by the detector in the security inspection channel;
   wherein the security inspection machine is in communication with the sorting robot, and the sorting robot is configured to, before entering the security inspection machine, send an identifier of the sorting robot to the security inspection machine.

2. The system of claim 1, wherein the article to be sorted on the sorting robot is provided with an address information code related to a destination of the article to be sorted.

3. The system of claim 1, further comprising a transport travelling platform configured to provide a mobile supporting platform for the sorting robot, wherein the transport travelling platform is any one of a ground platform, a track platform, or a built platform.

4. The system of claim 1, wherein the sorting robot is configured to move at a first speed before reaching the security inspection machine and move at a second speed on the security inspection driving device after reaching the security inspection machine.

5. The system of claim 4, wherein the sorting robot is configured to receive a speed instruction sent by the security inspection machine, and determine the second speed according to the speed instruction.

6. The system of claim 1, further comprising an article feeding end, wherein the article to be sorted is placed on the sorting robot in a manual or automatic manner at the article feeding end; wherein the sorting robot comprises a carrying platform configured to receive one or more articles to be sorted, and the carrying platform is any one of a flap, a belt, a cross belt and a roller.

7. The system of claim 6, wherein the sorting robot comprises a carrying platform configured to receive one or more articles to be sorted.

8. The system of claim 6, further comprising an article information identifying device, wherein the article information identifying device comprises an article inspecting device configured to acquire article information of the article to be sorted when the article to be sorted is entering the article information identifying device.

9. The system of claim 8, wherein the sorting robot is configured to acquire article information through the article inspecting device at a position of the article information identifying device.

10. The system of claim 8, wherein the article information identifying device is disposed at the article feeding end.

11. The system of claim 8, further comprising a controller, wherein the controller is in communication with the article inspecting device and the sorting robot respectively, and wherein the controller is configured to acquire article information of the article to be sorted, and allocate a sorting task to the sorting robot according to the article information.

12. The system of claim 8, wherein the security inspection machine is placed in front of or behind the article information identifying device, and the sorting robot is configured to, after receiving the article to be sorted from the article feeding end, enter the security inspection machine.

13. The system of claim 12, wherein
   the security inspection machine is configured to detect whether the article to be sorted on the sorting robot is safe, and send a detection result to the sorting robot;
   the sorting robot is configured to perform a sorting task in response to determining that the article to be sorted is safe; and
   the sorting robot is configured to move to a designated area in response to determining that the article to be sorted is unsafe.

14. The system of claim 8, wherein the article information comprises a destination of the article to be sorted.

15. The system of claim 14, further comprising an article falling end, wherein the article falling end is provided with an article receiving device, and the article receiving device is configured to receive the article to be sorted delivered by the sorting robot.

16. The system of claim 15, wherein a preset height difference exists between an article delivering point of the sorting robot and the article falling end.

17. The system of claim 15, wherein the sorting robot and the article falling end are disposed in a same plane.

18. The system of claim 15, wherein the sorting robot and the article falling end are disposed in different planes.

19. The system of claim 15, wherein the destination and the article falling end are in a correspondence of any one of one-to-one, many-to-one, one-to-many and many-to-many.

20. The system of claim 15, wherein the security inspection machine is disposed in front of the article falling end, wherein
   the security inspection machine is configured to detect whether the article to be sorted on the sorting robot is safe, and to send a detection result to the sorting robot;
   wherein the sorting robot is configured to deliver the article to be sorted to the article falling end in response to determining that the article to be sorted is safe; and
   wherein the sorting robot is configured to transport the article to be sorted to a designated place or deliver the article to be sorted to a designated article falling end in response to determining that the article to be sorted is unsafe.

* * * * *